UNITED STATES PATENT OFFICE.

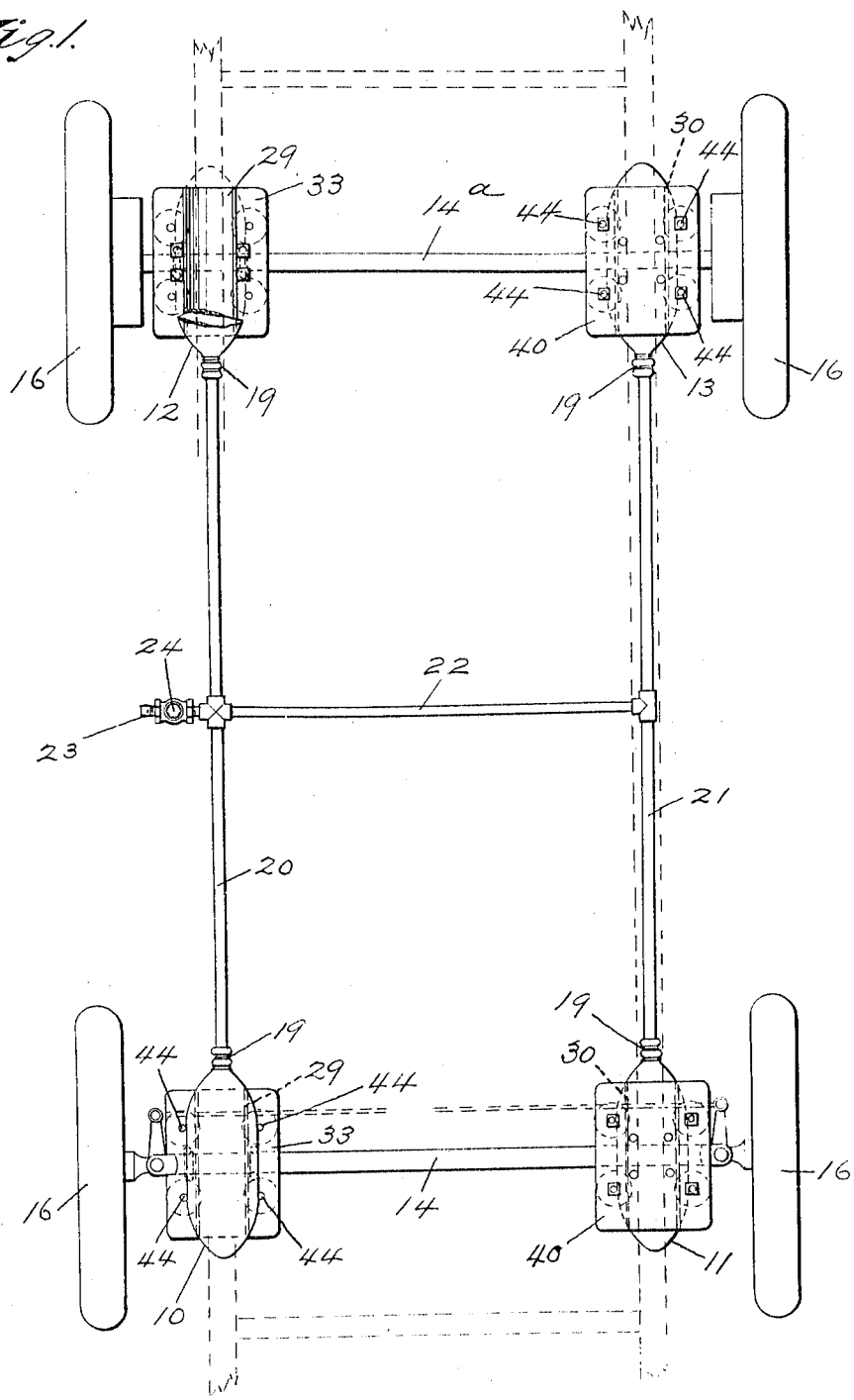

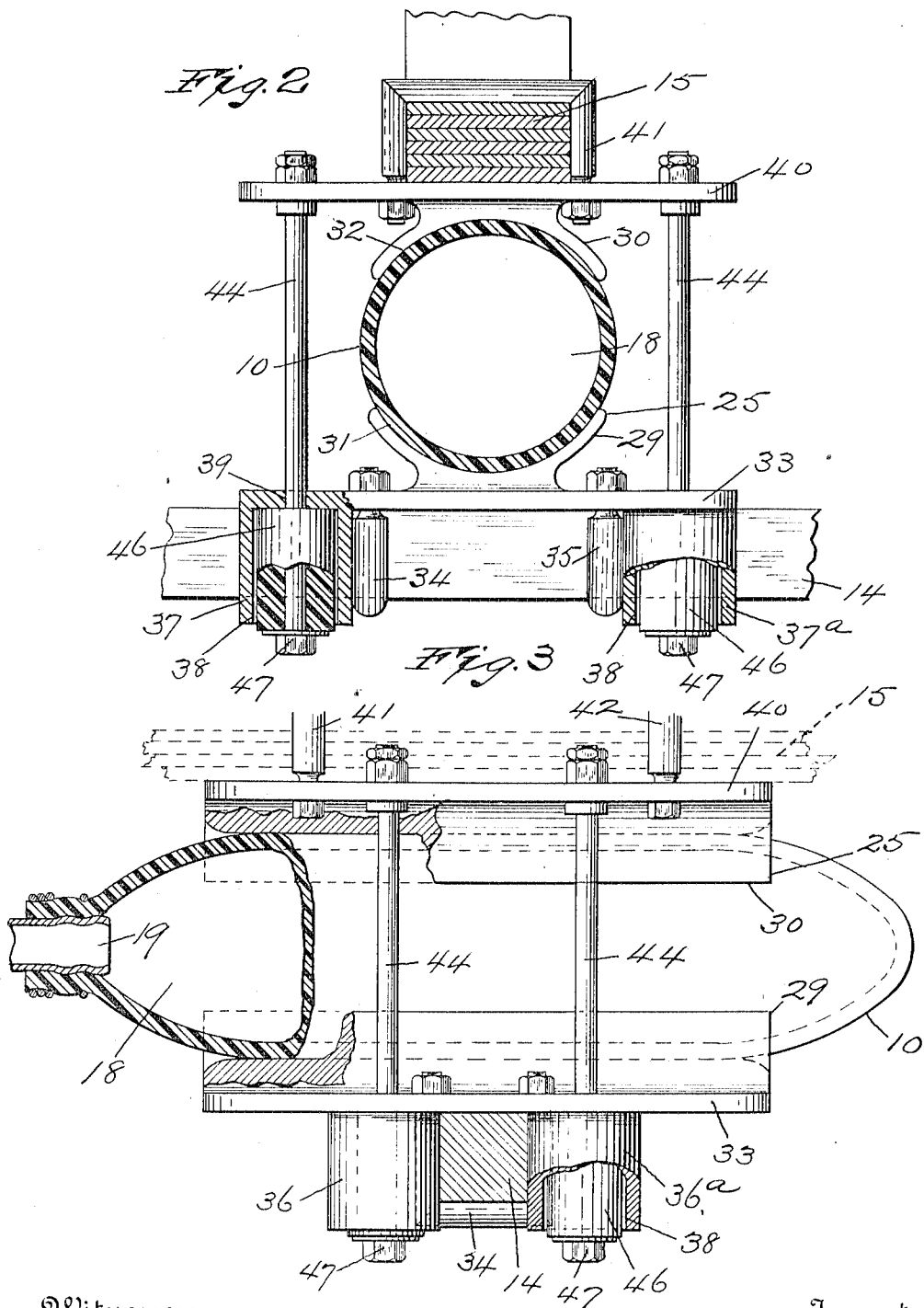

JOHN CALDWELL, OF NEW YORK, N. Y.

PNEUMATIC DEVICE FOR THE RUNNING-GEARS OF VEHICLES.

1,120,275.  Specification of Letters Patent.  Patented Dec. 8, 1914.

Application filed August 15, 1913. Serial No. 784,942.

*To all whom it may concern:*

Be it known that I, JOHN CALDWELL, a citizen of the United States, and a resident of New York, county and State of New York, have invented a certain new and useful Improvement in Pneumatic Devices for the Running-Gears of Vehicles, of which the following is a full, clear, and exact specification.

This invention relates to a class of devices adapted to be used in conjunction with automobiles, or other vehicles.

I am aware that a number of types of resilient running gears and resilient wheels for automobiles have been designed for the purpose of enabling pneumatic tires to be dispensed with, in order to obviate the great expense, waste of labor, and annoyance incident to the use thereof owing to their susceptibility of being easily punctured while traveling. These classes of devices are ordinarily of such a complicated construction that it is impossible to combine the required efficiency and durability whereby they may be adaptable for practical use.

My invention has for its object primarily to overcome these objections by providing a pneumatic device for running gears of vehicles, such as automobiles, and wherein a plurality of chambers charged with air under pressure are employed in a manner to provide pneumatic cushions of requisite resiliency to overcome all jolting of the vehicle while traveling, thereby permitting the pneumatic tires of the wheels to be dispensed with, or the device as well as the pneumatic tires may be jointly used if desired.

Another object of the invention is to provide shoes in which each of the pneumatic cushions is mounted so as to retain the cushions against accidental displacement, and each of the shoes has two members which are yieldingly movable with relation to each other.

A further object of the invention is to provide a pneumatic device of simple and efficient construction, and which is of a form to adapt it to be used in conjunction with the usual, or any preferred type of automobile, or other vehicle.

A practical embodiment of the invention is represented in the accompanying drawings forming a part of this specification in which similar characters of reference indicate corresponding parts in all the views, the said invention being more fully described hereinafter, and then pointed out in the appended claim.

In the drawings, Figure 1, is a view, partly fragmentary and partly broken away, showing a top plan of one form of pneumatic device embodying my invention as applied to the running gear of a vehicle. Fig. 2 is an enlarged fragmentary view, partly in detail and partly in section, showing an end elevation of one of the pneumatic cushions, and Fig. 3 is an enlarged fragmentary view, partly in detail and partly in section, showing a side elevation of the pneumatic cushion shown in Fig. 2.

The device has preferably four pneumatic cushions 10, 11, 12, 13, two of which are mounted upon each of the axles 14, 14$^a$ so that one of the cushions will be disposed underneath each of the usual laminated springs 15 of any well-known, or preferred type of automobile, or other vehicle having wheels, as 16.

The pneumatic cushions 10, 11, 12, 13 are preferably alike in shape, and each of said cushions is in the form of a substantially elliptic bag or casing made of rubber, or other resilient material to provide a chamber 18 therein adapted to be charged with air under pressure. The corresponding ends of the bags on the axle 14 are apertured, and the corresponding opposed ends of the bags upon the axle 14$^a$ are likewise apertured. In the aperture of each of the bags is sealed one end of a flexible tube, as 19, which may be made of rubber, or other similar material.

In order to permit the chambers 18 of the bags, or cushions to be charged in unison with air, or other fluid under compression, the tubes of two of the bags are connected by a pipe 20, and the tubes of the second pair of the bags are connected by a pipe 21. The pipes 20 and 21 are also connected by a pipe 22, and in this manner communication is provided between all of the pipes and between all of the chambers 18 of the bags. Interposed in the pipe 20 is a nozzle 23 which serves as an inlet, and in said nozzle is mounted a cut-off valve 24. By operating the valve 24 for opening the passages through the nozzle 23 and through the pipes 20, 21, 22, the bags may be simultaneously inflated with air, or other fluid to a suitable pressure by admitting the fluid through the nozzle from any desired source of supply.

Serving to retain the bags, or cushions 10, 11, 12, 13 against accidental displacement between the springs and the axles of the vehicle as well as protecting the bags against being damaged, each of the bags is mounted between shoes, as 25, all of which are similarly constructed. Each of the shoes 25, have corresponding lower and upper members, or plates 29 and 30, the opposed surfaces of which are curved in the form of an arc, at 31 and 32, and between the curved surfaces of each pair of said plates is disposed one of the bags, or cushions, 10, 11, 12, 13. Upon the member 29 of each shoe and opposite to its curved surface is a supporting plate 33, and each of these supporting plates is connected to an axle of the vehicle by two straddle straps 34 and 35 of the usual forms. Between the straps 34 and 35 and the ends of each of the supporting plates 33 are spaced bosses, or extensions 36, 36$^a$ and 37, 37$^a$ all of which project some distance below the underside of each of said supporting plates. The underneath surface of each of the bosses 36, 36$^a$ and 37, 37$^a$ is recessed, at 38, and through each of the supporting plates midway of each of the recesses thereof is an opening 39. Upon the member 30 of each shoe and opposite to its curved surface is a supporting plate 40, and each of these supporting plates is connected to one of the springs of the vehicle by two straddle straps 41 and 42. Through each of the supporting plates 40 are a number of openings, not shown, one of which is in register with each of the openings 39 of each of the supporting plates 33. The members 29 and 30 of each of the shoes are thereby arranged in opposed relation on the underside and on the top, respectively, of each of the bags, or cushions, 10, 11, 12, 13 so that when the pneumatic bags, or cushions alternately contact and expand in accordance with the jars of the wheels of the vehicle the members of the shoes will move in conformity therewith.

For the purpose of permitting the movement of the members of each of the shoes 25, to be accurately guided with relation to each other, I provide each shoe with preferably four guiding elements, or bolts, as 44. The upper ends of each of the bolts 44 is rigidly held by nuts, or otherwise in one of the openings of the supporting plate 40 of each of the shoes. All of the bolts 44 extend in a downwardly direction, and the other end portion of each bolt is movably guided through the corresponding opening 39 of the supporting plate 33 of each of the shoes. One of the bolts 44 will thereby extend into the recess of each of the bosses of the supporting plate 33, and upon this end of each bolt is threaded an adjusting nut 45. Encircling each of the bolts 44 is a buffer 46 of rubber or other resilient material having one of its ends resting against the upper part of the wall of the recess of each of the bosses 36, 36$^a$ and 37, 37$^a$, and the other end of each spring abuts against the adjusting nut 47 of its respective bolt. The buffers 46 normally serve to force the bolts 44 outwardly of the recesses of the bosses of the supporting plates 33, so as to hold the pneumatic bags, or cushions in the shoes to efficiently provide the required resiliency whereby the pneumatic tires on the wheels of the vehicle may be dispensed with, and solid rubber tires used instead if desired, or my device may be used upon vehicles in conjunction with pneumatic tires as occasion requires.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claim.

Having thus described my invention, I claim as new and desire to secure by Letters Patent:—

In a device of the character described, resilient receptacles for containing air under pressure, one disposed on the axle of a vehicle adjacent each wheel thereof, a pipe communicating with inlets provided in each of said receptacles, and a cock disposed in said pipe, on one side of the vehicle whereby all of the receptacles may be filled with air simultaneously from a common source of supply, in combination with a concave plate rigidly secured by bolts to the axle beneath the receptacle, and a concave plate rigidly secured to the body of the vehicle in obverse relation to the concave plate above and upon the receptacle, bosses upon one of said concave plates, buffers disposed in said bosses, and bolts disposed through openings provided in the bosses and buffers, said bolts extending upwardly and through openings provided in the concave plates, and means for securing said bolts whereby the plates are yieldingly secured in the proper relative positions, substantially as shown and described.

This specification signed and witnessed this fourteenth day of August A. D. 1913.

JOHN CALDWELL.

Witnesses:
  ROBT. B. ABBOTT,
  M. DERMODY.